United States Patent [19]

Tangorra

[11] Patent Number: 4,543,080
[45] Date of Patent: Sep. 24, 1985

[54] DRIVING BELT
[75] Inventor: Giorgio Tangorra, Monza, Italy
[73] Assignee: Industrie Pirelli S.p.A., Milan, Italy
[21] Appl. No.: 598,852
[22] Filed: Apr. 10, 1984
[30] Foreign Application Priority Data Apr. 18, 1983 [IT] Italy .................. 20657 A/83

[51] Int. Cl.⁴ .................................... F16G 1/28
[52] U.S. Cl. .................. 474/204; 198/834; 198/847; 474/205
[58] Field of Search ........... 474/204, 205, 91, 260, 474/263, 264, 268; 198/834, 847

[56]  References Cited
U.S. PATENT DOCUMENTS 3,120,409  2/1964  Beall ........................ 474/204 X
3,515,443  6/1970  Hallaman ................... 474/204 X
3,577,794  5/1971  Kerfoot, Jr. ............... 474/204
3,608,702  9/1971  Fraioli, Sr. ............... 198/847 X Primary Examiner—Stephen J. Novosad
Assistant Examiner—Thuy M. Bui
Attorney, Agent, or Firm—Stevens, Davis, Miller & Mosher

[57] ABSTRACT

Belt for transmitting motion between two pulleys comprising a flat-shaped annular body of elastomeric material, reinforced with continuous and flexible elongated elements, resistant to traction and arranged in the longitudinal direction of the belt, a plurality of openings in the belt to engage with protuberances on the pulleys, at least one continuous reinforcing element disposed around the opening with ends anchored to the longitudinal elements.

11 Claims, 12 Drawing Figures

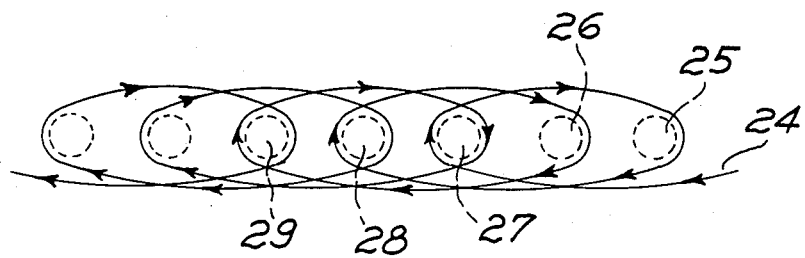
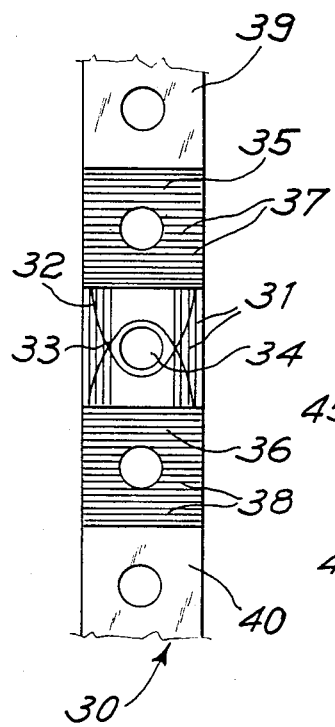
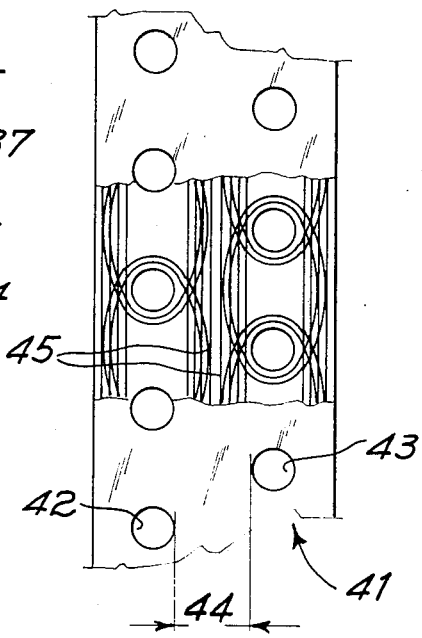
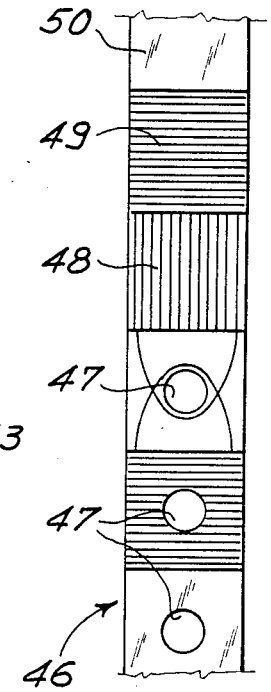
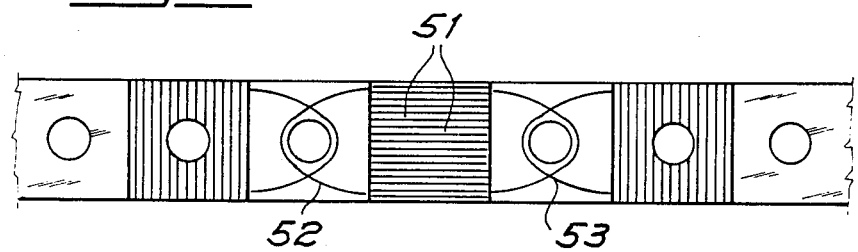

DRIVING BELT

DESCRIPTION

The present invention relates to a belt for transmitting motion between pulleys; and more particularly, it relates to a new belt comprising an annular body of elastomeric material or the like, reinforced with suitable continuous elongated elements arranged around openings provided in the belt body and adapted to engage with corresponding protuberances on the pulleys constituting part of the transmission.

As well known, driving belts having a body of elastomeric material are essentially of three types and are identified according to their shape as flat belts, V-belts, and toothed belts. Each type of belt has its own field of use.

In particular, the flat belts have the characteristic of being very flexible so that they can be used with a high ratio of transmission. Unfortunately, said belts transmitting power to the pulleys through friction have performances limited by the forces of friction and obviously they do not have any synchronous motion.

The V-belts, compared to flat belts, have the advantage of transmitting a higher power through a particular wedging action of the flanks of the belt between the faces of the pulleys in order to increase the engagement, the whole having a more reduced sectional area.

However, the V-belts are less suitable than the flat belts for high speeds and, owing to their greater thickness, they are subjected to greater losses of power, due both to the bending deformations and to the transverse compression to which they are subjected on their travel around the pulleys.

The toothed belts, besides having a synchronous property, transmit power through the teeth of elastomeric material projecting from the annular body and engaging with corresponding spaces on the pulleys; therefore, said belts are not limited by friction as are the other belts previously cited.

However, in some circumstances, especially under stresses, there may take place the drawback of a skipping phenomenon, i.e., the skipping of the belt tooth with respect to the spaces of the pulleys, with loss of transmission of motion and with consequent unacceptable drawbacks.

Therefore, in these belts it is necessary to apply a tensioning force between the two pulleys to avoid the cited skipping. Said tension must be rather high in order to guarantee the compensation of the relaxations and the wear of the structure in time.

Furthermore, in some applications it is possible to notice in the toothed belts a certain noise.

Then it is to be noted that the weight of the toothed belts can cause critical vibrations even at not excessively high speeds. A drawback common to all the belts of the synchronous type is, further, the precision by which the pulleys must be aligned in order to avoid ruptures and coming out of their seat.

In the case of the belts having teeth on both faces, those skilled in the art well know the difficulties of manufacture and the criticality of operation.

Several improvements have been made to the belts of the cited types; however, practical limits have apparently been reached that are very difficult to overcome and it has not seemed possible to increase still further the friction coefficient between the flat belts to increase considerably the wedging action in the races of the pulleys of the V-belts, and to go beyond particular elastomeric compounds for the teeth of the toothed belts.

But, while admitting the theoretical possibility of overcoming all the present difficulties in any one type of belt, it does not seem possible to collect in a single belt all the advantages offered by the several individual belts of the conventional types.

Therefore, the present invention aims at providing a belt for the transmission of motion between two pulleys which is able to overcome simultaneously all the cited drawbacks and which is further very flexible and lightweight, subjected during the movement to a very low heating of the elastomeric material, and substantially nondeformable, thereby guaranteeing a correct transmission of the motion.

The object of the present invention is to provide a belt for transmitting motion between two pulleys, comprising an annular body of elastomeric material, said belt being characterized in that it comprises a flat-shaped annular body reinforced with continuous and flexible elements resistant to traction, directed in the longitudinal direction of the belt, at least a plurality of openings provided in said annular body aligned in the longitudinal direction of the belt to engage with corresponding protuberances on the pulleys, said openings extending partially over the width of said belt, at least a continuous and flexible elongated element, resistant to traction, arranged around the contour of each opening in the portion adapted to contact or mesh with the tooth of the pulley, said element disposed around said contour having the ends extending up to reach said longitudinal elements disposed laterally with respect to said openings.

Therefore, the transmission of motion takes place in correspondence with the engagements between the openings provided on the belt and the corresponding protuberances or teeth of corresponding shape provided on the two pulleys and forming part of the transmission.

The stresses transmitted, for instance from the driving pulley to the belt, are determined by the contact of the protuberances of the pulleys against the portions of the contours of the corresponding openings wherein said protuberances are introduced. These stresses do not modify the geometry of the contours of the openings since the continuous element, for instance in the form of cord, constitutes a nondeformable reinforcing structure arranged around said contour.

The cord under stresses can be compared to a rope wound around a pulley, whose ends are subjected to traction.

In fact, here the cord loaded by the pulley tooth, as in the case of the cited rope, transmits to its extremities the force of impact of the tooth and said extremities in their turn unload or transfer said force in equal parts to the anchoring structure of the belt formed by the longitudinal elements which are disposed at the sides of the openings.

Like that which occurs in the rope, the ends of the cord will transmit the total load of the tooth to the anchoring system disposed at the sides of the opening; in practice, substantially without transverse components of force.

As a matter of fact, the two ends of the cord have a slight inclination with respect to the longitudinal direction of the belt in order to increase the extension of the bond with the anchoring lateral zones. Consequently, a certain component of the tooth force will be acting in transverse direction with respect to the longitudinal element, but the effect of said transverse components will be modest and will not require variations in the arrangement of the belt.

In practice, the configuration of the cord or of the continuous and inextensible similar elements disposed around the openings, in the invention, can be likened to a catenary, not stretched, in which at the suspension points there are negligible transverse stresses.

In conclusion, when there occurs the engaging condition between pulley and belt, the load transmitted by the tooth on the cord placed around the opening is equivalent to a distribution of said force on the whole cord as the said cord is suspended in the air by its own weight and connected only at the ends, assuming therefore a catenary configuration.

As shown in the present invention, all the elastomeric material of the belt and the whole annular body has only the function of supporting the whole reinforcing structure, and this is contrary to what happens, for instance, in the toothed belts where a good part of the elastomeric material and the teeth projecting with respect to the annular body have the essential function of participating in the engaging operation with the metallic teeth of the pulleys.

Consequently, the belt according to the present invention, giving only to the reinforcing structure formed by the cited element the exchange of the interaction stresses between belt and pulleys during motion, protects all the elastomeric material from cyclic stresses resulting, in practice, in an absence of heating in the annular body of the belt and a longer lifetime for the belt itself.

Further, the belt according to the present invention is characterized by high flexibility; in fact, the whole basic reincforcing structure is made up substantially of elements in the form of cords or the like directed longitudinally with respect to the belt or in a practically curvilinear way around the openings.

Consequently, said elements are reinforcing elements having reduced transverse dimensions and the annular body of the belt having to carry out the cited function of supporting said reinforcements will have consequently a reduced section, substantially as in the flat belts.

However, the flexibility of the belt according to the present invention is still higher than that of the flat belts, since the belt is devoid of material in correspondence with the opening adapted to engage with the teeth of the pulleys forming part of the transmission.

Owing to the high flexibility, the present belt can be easily adapted to any bending radius of the pulleys with which it might be associated.

In the belt according to the present invention also, the light weight is a characteristic still more marked than in all the other cited belts and this results in considerable reduction of the vibrations, and above all in an improvement in the noiselessness of the whole transmission.

Furthermore, the belt according to the present invention may be used for transmitting high values of power, not being bound, as in the flat and V-belts, by the limits given by the friction coefficients, and by the wedging action between the pulleys achievable up to now.

In fact, here the transmission of power takes place as in the toothed belts or in the chains and on the basis of meshing; in this case, between the openings provided in the annular body of the belt and the teeth or protuberances arranged on the pulleys.

In substance here, the values of power that can be transmitted are related to the resistance capacity of the reinforced structure embedded in the annular body and to the particular resistance of the curvilinear and longitudinal elongated elements in the form of cords or the like.

The present belt, although having a synchronous operation, i.e., without sliding with respect to the pulleys, differs clearly and advantageously both with respect to toothed belts and to chains.

In fact, with respect to the known toothed belts, the present belt has the advantage of not being polygonal in contact between pulley and belt, of having a nondeformable structure, practically operating without pretensioning and also with a non-perfect alignment of the pulleys and, with respect to the chain, the present belt has the advantage of having a transmission suitable to operate also at a high speed with pulsating loads, completely devoid of the noise typical both of the chains and of the toothed belts and without the need of having recourse to a lubricating operation.

The present invention will be still better understood by the following detailed description made by way of non-limiting example with reference to the figures of the accompanying drawings, in which:

FIG. 4 shows partially an alternative embodiment of the reinforcements of FIGS. 2 and 3;

FIG. 5 shows the various layers forming the belt between the two furthermost faces;

FIG. 6 shows a belt comprising a double row of openings and the reinforcing structure around the openings and between the rows of openings;

FIGS. 7 and 8 show further embodiments relating to the layers of the belt between opposite faces;

Figure 11:
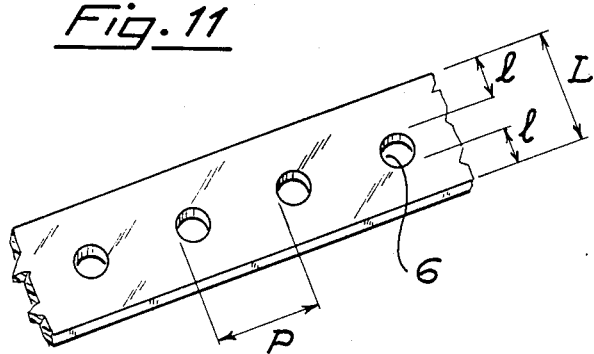
Figure 12:
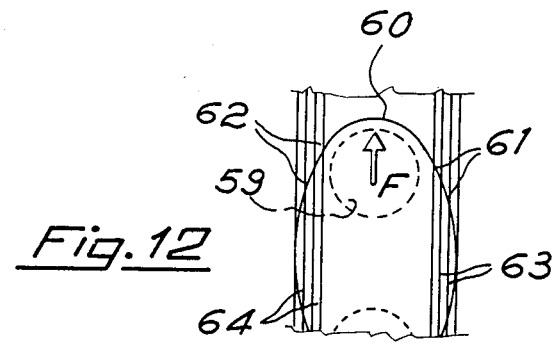

FIG. 11 stresses some geometrical sizes of the belt described in the present specification; and FIG. 12 shows the behavior of the belt under stress.

Figure 1:
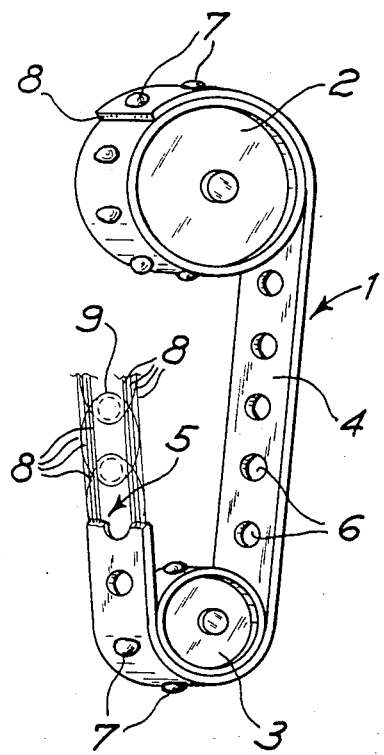
FIG. 1 shows in a perspective view and with parts broken away the belt associated with the relative pulleys forming part of the transmission.

By way of general example, FIG. 1 represents a transmission comprising the driving belt 1 associated with the two pulleys 2, 3, which are, respectively, driving and driven pulleys.

The belt 1 comprises (FIGS. 1 and 2) a flat-shaped annular body 4 of elastomeric material or the like, having embedded therein a resistant structure 5 and a plurality of openings 6 which, in these figures, pass through the annular body to engage with corresponding protuberances 7 on the pulleys.

The material forming the annular body may be an elastomeric material or elastomeric material with dispersed charges, or also for instance a polyurethane type material. By "elastomeric material with dispersed charges" is meant fibers of small length or similar elements embedded in the elastomeric material, or also elements different from the short fiber shape, for instance inert particles having the purpose of reinforcing the elastomeric material. In one embodiment, the particles may be carbon black particles.

In the present specification the word "opening" means any perforation whatsoever through the thickness of the annular body 4 having a desired contour, for instance having a circular or elliptical or non-curvilinear profile. Said openings cover partially the width of the belt and form areas delimited by the elastomeric material both longitudinally and transversely.

As a specific embodiment, in the present description reference will be made to an annular body 4 comprising a plurality of substantially circular holes 6 aligned the one after the other in the longitudinal direction of the belt and in central position with respect to the belt, as shown in FIG. 1.

In like manner, the term "protuberances" means any radial projecting part of the pulleys whatsoever on condition that it has a shape and a profile suitable to penetrate and therefore to engage with the cited "openings". Said protuberances, for the sake of simplicity, will be indicated hereinafter as "teeth" of the pulleys.

In the more general aspects of this invention, said structure 5 includes a plurality of flexible and continuous elongated elements 8, resistant to traction, extending in the longitudinal direction of the belt, and at least one continuous flexible elongated element 9, also resistant to traction, arranged in such a way as to follow substantially the profile of the portion of each opening 6 adapted to engage with the pulley tooth.

The expression "flexible continuous elongated elements, resistant to traction" means elements in the form of cords or also substantially inextensible monofilaments of various materials, for instance textile materials, or in the form of thin metallic wires; in particular, the cited definition includes glass fibers, aramide polyamide fibers more specifically known as Kevlar fibers, polyester fibers, nylon fibers, or fibers of different materials as used in driving belts.

Figure 2:
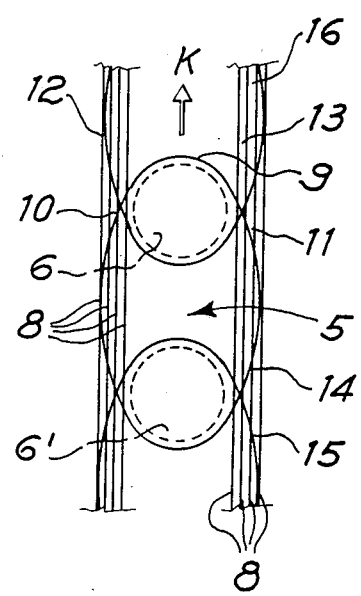
FIG. 2 shows in a top view and with parts broken away a particular detail relating to the reinforcing structure internal to the belt.

As shown in FIG. 1 and in the embodiment shown in FIG. 2, said longitudinal elements 8 in one embodiment are arranged in a position lateral to the openings 6 and constitute the anchoring system on which all the stresses transmitted by the pulleys to the belt are discharged or taken up.

Said continuous element 9, as stressed in the figures, follows faithfully the contour of the opening 6 up to reach with the ends 10, 11 the two lateral zones 12, 13 (FIG. 2), where said longitudinal elements 8 are disposed.

In practice, the element 8 assumes the shape of a flipper or loop around the semi-circumferential portion of the opening 6 and joins in a stationary way to the longitudinal elements 8 through the cross-linking process of the elastomeric material, forming the annular body embedding the whole reinforcing structure 5.

Said ends 10, 11 of the continuous element 9 are directed along two directions inclined substantially in a symmetrical way with respect to the longitudinal direction of the belt.

Preferably, the inclination of said ends 10, 11 is between 0° and 50°. More preferred embodiments are those characterized in having low values of inclination angles so as to transmit as much as possible all the force of the pulley tooth onto the longitudinal reinforcements of the zones 12, 13 (FIG. 2.)

According to the cited embodiments, there are nullified or reduced notably the transverse components that otherwise could tend to modify the dimensions of the openings 6 during engagement with the teeth of the pulleys.

Therefore, preferred embodiments are those in which the reinforcement has a catenary curve layout.

The shape of the loop around the opening 6 may vary according to different solutions.

As shown in FIG. 2, said loop may be made in the form of a closed turn 14 intersecting two successive openings 6 and 6'.

The turn is obtained, for instance, with a single cord whose ends are in contact for a certain length and anchored to the elastomeric material embedding the turn.

In this case, a first half of the turn constitutes a first loop adapted to function when the opening 6 in the upper part of the FIG. 2 receives a thrust in the direction of the arrow K from the corresponding tooth of the pulley engaging said opening 6.

Vice versa, the second half of the turn constitutes a second loop for the other opening 6' adapted to work when the belt moves in a direction opposite to the direction K.

The successive turns 15, 16, represented partially in FIG. 2, in the embodiment there shown constitute the means adapted to form the two further loops around the two openings 6, 6' to permit engagement with the pulleys acting differently in the two possible senses of rotation.

Further, it is possible, supposing only one sense of movement of the belt, to form loops around the openings 6 using half-turns. Of course, the continuous elements arranged around the opening wound in the form of a loop could be more than one, concentric and not superimposed.

According to an essential characteristic of this invention, the ends 10 and 11 of each continuous element 9 are extended for a good length along the longitudinal zones 12 and 13 at the sides of the openings 6 and 6' so as to guarantee an anchoring extended in length with the continuous longitudinal elements 8, in absence therefore of concentrated points corresponding to knots.

According to an alternative embodiment, the structure forming the loop around each opening 6 may take a different form from that shown in FIG. 2.

Figure 3:
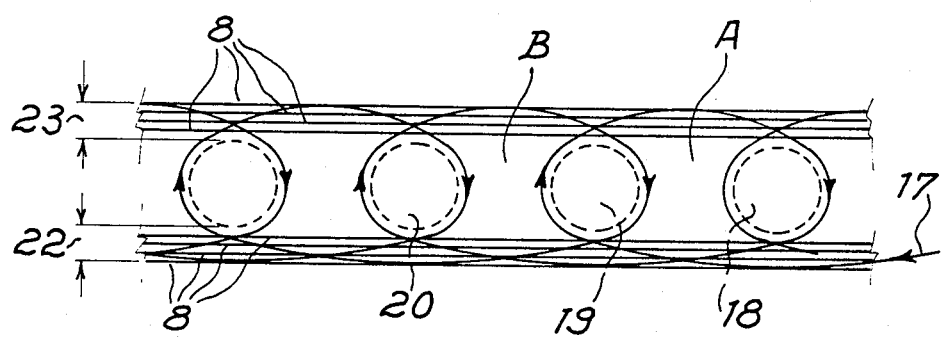
FIG. 3 shows an alternative embodiment to the reinforcement of FIG. 2.

In practice, the continuous element adapted to constitute the reinforcement around each opening of the belt is, for instance, a single textile cord 17 (FIG. 3).

Now there is described the run of the cord 17 to form the loops around the openings, for instance around the opening 19. The direction of the run is indicated in the figure with small arrows.

The cord 17 passes first along the lateral zone 22 to be wound partially around the half-circumference of the opening 19, then, through the lateral zone 23, said cord reaches back and is wound partially around the half-circumference of the opening 18 coming back on the lateral zone 22, defining thus a first closed turn A around the two openings 18, 19; subsequently, the same cord passes again along the lateral zone 22 to be wound partially around the half-circumference of the opening 20 and then through the lateral zone 23 it reaches back and is wound partially around the opening 19 coming back on the lateral zone 22 and defining thus a second closed turn B around the openings 20 and 19.

As clearly shown in FIG. 3, the textile cord 17 forms two turns A and B which are linked to each other around the opening 19, defining thus an inextensible and resistant closed profile around the opening 19 itself; said closed profile is adapted to transmit the stresses from the pulley tooth which it engages to the lateral zones 22 and 23, since the cord 17 passing in said zones is bound on the longitudinal elements 8 through the elastomeric material of the annular body of the belt.

The run of the cord 17 is repeated in the same way for the remaining part of the belt, thus forming a plurality of closed turns around a pair of successive openings and defining in every two turns a closed profile around each opening.

Of course, the embodiment indicated in FIG. 3 is not the sole possible embodiment, and in particular the successive turns could have dimensions more extended in the sense of the length of the belt and anyhow greater than those indicated in FIG. 2.

For instance, a cord 24 could follow the run represented in FIG. 4 in the direction indicated by the arrows.

As shown, each turn of the cord 24 has in this case such a width as to surround three successive openings; and more precisely, a first turn surrounds the openings 25, 26, 27, a second turn surrounds the openings 26, 27, 28, and a third turn surrounds the openings 27, 28, 29; etc., etc.

In this embodiment, the formation of the reinforcing closed profile around any one opening is attained when the cord 24 in its run has completed three turns, as stressed in FIG. 4 for the opening 27.

The embodiment of FIG. 4 differs from that of FIG. 3 in its ability to distribute over a greater lateral extension with respect to the openings, the anchoring portion of the cord 24 to the longitudinal elements (not shown in the figure), which are adapted to sustain all the stresses of the transmission.

In further embodiments, a cord may follow runs completing turns still greater than those of FIG. 4, for instance turns enclosing four or five openings, with the formation of closed profiles around each opening, respectively, every four or five turns.

Furthermore, the cord, or another cord, can be arranged in such a way to form loops with opposite running direction.

For the sake of simplicity, said further embodiments deriving from that which is readily deducible from FIGS. 3 and 4 are not illustrated.

The turns in all the cited embodiments may be formed by not only one cord, but also by a plurality of ends, i.e., by cords laid up together in any way whatsoever in order to provide a still greater resistant section in each turn.

In particular applications adapted for the transmission of high powers, the reinforcing structure 5 of FIG. 2 may also comprise further layers or strips of elastomeric material provided with continuous and flexible elongated elements arranged in a continuous manner transversely to the longitudinal direction of the belt.

For instance, in FIG. 5 the belt 30 comprises a central position at one-half of the thickness of the annular body cords 31 or similar elements directed longitudinally, two loops 32, 33 formed by further cords to constitute the reinforcement around the opening 34, and at a position substantially symmetrical with respect to said central plane the further layers, i.e., two layers 35, 36 with transverse cords 37, 38 and two covering layers 39, 40 of elastomeric sheet material.

This embodiment is adapted to couple both the faces of the belt on corresponding pulleys forming part of the transmission.

In this embodiment, the openings of the belt have a wider section at the faces of the belt and a lesser section at the central plane.

In this way, the light compression condition to which the outermost layer of the belt is subjected when wound around the pulley and the consequent small reduction in the section of the opening area on the face of the belt in contact with the pulley is compensated by the greater starting dimension of the section itself of the opening; the section of the opening arranged on the central plane at one-half of the thickness of the belt does not change its contour, since the same is arranged on the neutral axis of the resistant section of the belt.

Therefore, also in this embodiment, there is a condition of perfect engagement between the openings of the belt and the pulley teeth.

The belt, at its innermost part adapted to be in contact with the pulleys, and also all around the opposite face, may comprise an anti-abrasive covering in the form of fabric.

Preferbly, said anti-abrasive covering comprises two fabrics doubled together with the interposition of a layer of elastomeric material; the outermost fabric may be a self-lubricating fabric, as cited in Italian Pat. No. 864,204 corresponding to U.S. Pat. No. 3,621,727.

In one example, said fabrics are rubberized nylon fabrics. As an alternative, the anti-abrasive covering instead of being constituted by a fabric, may consist of compounds felted for instance with polyester or nylon or with Kevlar or the like.

In particular, the arrangement of said coverings on the opposite faces of the belt permits the introduction of small fringes or thin strips of said fabrics toward the inside of the openings themselves, thereby causing an adhesion of said thin strips of the inner walls of the openings.

FIG. 6 shows a belt 41 completely like those previously described, but with the difference of providing a plurality of openings 42, 43 arranged on parallel rows, said openings being preferably offset with respect to one another, as shown in that figure.

The openings are reinforced with windings made up of a plurality of turns, one around the other.

The belt of FIG. 6 can be favorably used for engagement with pulleys comprising teeth arranged on parallel rows and offset with respect to one another when the transmission of high powers is required.

According to the main principle of the present invention, said openings disposed on parallel rows must be arranged in such a way as to leave longitudinally between one row of openings and the other a continuous space 44 devoid of any kind of interruption, necessary for the arrangement of cords 45 or similar elements longitudinally directed.

FIG. 7 shows a belt 46 similar to that of the preceding figures, with the difference that the openings 47 are not through openings, as clearly shown by observing the layer 48 having longitudinal cords, the layer 49 having transverse reinforcements and the outer covering 50.

This embodiment is adapted to engage the belt on only one face and has the advantage of being able to have the cited openings formed therein by means of small milling cutters, or with appropriate molding.

Similar to that of FIG. 7, it is also possible to obtain for instance a belt adapted to operate on both faces, as shown in FIG. 8, by providing openings on the opposite faces without affecting the central layer of longitudinal cords 51.

Further, it is possible to have more curvilinear reinforcing profiles around each opening, by arranging the cords adapted to form the various loops on a plurality of layers, for instance on two layers of elastomeric material 52 and 53 disposed adjacent the layer comprising the longitudinal cords 51.

According to further embodiments, the openings of the belt may have contours different from a circular contour. For instance, FIG. 9 shows a belt characterized in having the opening 54 provided with an oval-shaped contour, and consequently very extended in a direction transverse to the belt to reduce the specific pressure due to the impact of the pulley tooth engaging with the opening in the belt.

Figure 9:
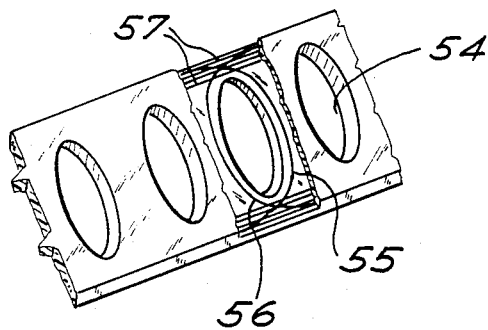
FIGS. 9 and 10 show in perspective view alternative embodiments to the configurations of the openings.

As shown by the part broken away in FIG. 9, in this embodiment the cords form two loops 55, 56 whose ends serve to bind with the longitudinal cords 57 at the sides of the openings.

Figure 10:
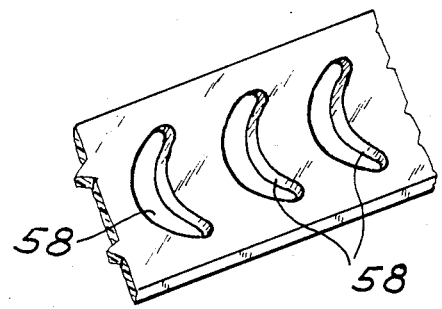

Also, the contour of the opening crossing the annular body may be very extended in the transverse sense with respect to the belt, with a substantially semi-circular shape, as shown with reference numeral 58 in FIG. 10. This shape is permissible only when the belt moves in only one running direction.

In all the cited embodiments, there have been found some preferred geometrical relationships among some sizes of the belt.

As shown in FIG. 11, if the distance between two successive belt openings is indicated by P and if the diameter of each opening of the belt is indicated with D, then the said distance P can be linked to the diameter D according to the following interval or range of values:

$$P = 1.25 \ D \ \text{and} \ 2.5D$$

This relationship is valid also in the case of an opening having a contour different from circular, intending to indicate in this case by D the maximum dimension of the opening in the longitudinal direction of the belt.

In particular, the longitudinally continuous lateral portions of the belt in respect of the openings 6 have a width 1 referred to the total width L in the interval or range:

$$l = 0.1 \ L \ \text{and} \ l = 0.40 \ L$$

The behavior of the belt under stress during the transmission of motion is as follows:

In this situation, the segment of belt shown in FIG. 12 is stretched between driving pulley and driven pulley; in fact, the openings of the belt portions (not shown) engaging with the driving and driven pulleys put into traction the inextensible longitudinal cords that constitute an anchoring system with a practically unchanged configuration with respect to the openings disposed at a central position to the belt in the portion considered in the figure.

Supposing that the opening 59 is subjected to to resulting thrust F transmitted by a pulley tooth, said stress will be transmitted to the ends 61, 62 through the cord 60; in their turn, said ends 61, 62 will unload or transfer in equal parts the whole stress onto the longitudinal cords 63, 64.

The transmission of the stress between the ends 61, 62 of the cord 60 and the longitudinal cords 63, 64 is complete and immediate, since all the cords are practically directly in contact with one another and mutually linked by the cross-linking of the elastomeric material embedding said cords.

In the transmission of the stress from the walls of the opening to the longitudinal cords, there is the transmission of transversal components of modest values and such as not to alter substantially the parallelism of the longitudinal cords. This characteristic derives from the choice previously described of the angles of inclination of the ends of the cords, and more generally from the particular catenary curve configuration of the reinforcement around the opening.

Consequently, deformations of the contour profiles of the belt openings area avoided, and since the openings which are not yet engaging remain with unchanged configuration, at the right moment they have a correct and gradual engagement with the teeth of the pulleys.

The belt may be manufactured for instance by manufacturing openings by molding of the elastomeric material of the belt around a central core, internal to the mold and comprising suitable projections adapted to determine the desired contour of the openings.

Subsequently, around the cited projections or on another suitable drum provided with projections, it is possible to manufacture the various reinforcing structures with curvilinear shape, as shown in FIGS. 3 and 4.

Finally, besides the layers already cited, there may be added further layers and so on with known devices for the cross-linking of the elastomeric material.

Owing to the characteristic of high flexibility and light weight, the described belts have numerous advantages; in fact, the presence of textile cords or similar continuous elongated elements permits the belt body to adapt to any sudden variation in the alignment of the pulley shafts forming part of the transmission; for instance, in consequence of jerks when the belt constitutes one of the components of a motor vehicle.

In practice, the belt according to the present invention has a flexible rigidity practically negligible in the longitudinal direction.

This characteristic depends not only on the particular use of flexible elements, generally textile cords, but also on the presence of the openings provided in the annular body. In other words, the recourse to elastomeric materials helps to contribute a very high flexibilty and light weight through the alternating of openings and empty spaces.

In consequence of the cited characteristic of high flexibility and light weight, the belt according to the present invention may therefore be adapted to any desired run between pulleys having shafts disposed in any way whatsoever.

In particular, thanks to the characteristic of being so light, the belts according to this invention are practically devoid of high intensity mechanical vibrations.

The light weight is still more favorable in driving belts, according to the present invention, that are adapted to operate on both faces.

The advantage is evident in relation to the conventional toothed belts, in which the masses transported on both the faces, being constituted by teeth projecting with respect to the annular body, are greater than those of the present belt.

A further advantage of this invention resides in the easier and more economical formation of the belts herein described with respect to the toothed ones in cases where an article must be provided that is adapted to engage on both faces of the belt.

In fact, in the conventional "bi-toothed" belts, it is possible for some applications to meet with problems in the alignment of the upper and lower teeth during the manufacturing process.

In the belts of the present invention, the perforation through the thickness of the belt, with the consequent formation of through openings, permits a precise alignment between parts adapted to engage on both faces of the belt.

Then there are facilitated for clear reasons, in particular because of the flat shape of the belt, the lacing operations; therefore, there is favored the manufacture of said types of belts also on a plane of unlimited lengths.

A particular advantage of this invention is constituted in practice by the absence of a lever arm of the force transmitted by the pulley tooth to the contour of the opening with respect to the pitch line of the belt.

In fact, the distance between the plane containing the continuous longitudinal elements and the plane or layer containing the reinforcing element in the form of loops around the opening is very short, being linked in practice to the transverse dimensions of these elements.

What is claimed is:

1. A belt for transmitting motion between two pulleys comprising an annular body of elastomeric material, said belt being characterized in comprising a flat-shaped annular body reinforced with flexible and continuous elongated elements resistant to traction, directed in the longitudinal direction of the belt, at least a plurality of openings provided in said annular body aligned in the longitudinal direction of the belt to engage with corresponding protuberances on the pulleys, said openings extending partially over the width of said belt, at least one continuous and flexible elongated element, resistant to traction, arranged around the contour of each opening in the portion adapted to come into contact with the tooth of the pulley, said flexible elongated element disposed around said contour having ends extended so far as to reach said longitudinal elements arranged laterally with respect to said openings.

2. A belt as defined in claim 1, characterized in that said continuous element disposed around the contour of each opening has the shape of a catenary curve.

3. A belt as defined in claim 1, characterized in that said openings are through openings.

4. A belt as defined in claim 1, characterized in that the two ends of said continuous element disposed around the contour of each opening are symmetrically inclined with respect to the longitudinal direction of the belt with angles between 0° and 50°.

5. A belt as defined in claim 1, characterized in that said flexible longitudinal elements are in the form of cords, filaments, or the like.

6. A belt as defined in claim 1, characterized in that said continuous elements disposed around the contours of each opening are formed by a plurality of single turns enclosing more than one opening, the adjacent turns linking to one another so as to surround each one of said openings.

7. A belt as defined in claim 1, characterized in comprising flexible elongated elements resistant to traction embedded in said annular body, and directed transversely with respect to the longitudinal elongated elements.

8. A belt as defined in claim 1, characterized in comprising flexible elongated elements resistant to traction, placed at a central plane at one-half of the thickness of the annular body and in a position substantially symmetrical with respect to said central plane, the further layers being provided with reinforcing elements.

9. A belt as defined in claim 1, characterized in comprising an anti-abrasive covering on the surface of said annular body adapted to contact said pulleys, parts of said anti-abrasive covering being inserted into said openings of the belt.

10. A belt as defined in claim 1, characterized in that said annular body comprises a plurality of openings arranged the one after the other on parallel rows, between said rows there being interposed a continuous longitudinal zone devoid of any interruption, continuous longitudinal elements being disposed in said zone.

11. A transmission provided with belt and pulleys, characterized in comprising a belt as defined in claim 1, and at least a pair of pulleys having protuberances for engaging with the openings in the belt.

* * * * *